(12) United States Patent
Yasui et al.

(10) Patent No.: US 6,332,806 B1
(45) Date of Patent: Dec. 25, 2001

(54) FIXING APPARATUS

(75) Inventors: Katunori Yasui; Takashi Ishikawa, both of Takarazuka (JP)

(73) Assignee: Nippon Cable System Inc., Takarazuka (JP)

( * ) Notice: Subject to any disclaimer, the term of this patent is extended or adjusted under 35 U.S.C. 154(b) by 0 days.

(21) Appl. No.: 09/714,097

(22) Filed: Nov. 17, 2000

Related U.S. Application Data

(62) Division of application No. 08/975,201, filed on Nov. 20, 1997, now Pat. No. 6,171,141.

(30) Foreign Application Priority Data

Nov. 25, 1996 (JP) .................................................. 8-313932
Oct. 30, 1997 (JP) .................................................. 9-298848

(51) Int. Cl.[7] .............................. H01A 13/73; H02B 1/01; H01R 13/627; H01R 13/66; H01R 13/60
(52) U.S. Cl. .................... 439/545; 439/354; 439/567
(58) Field of Search .................................. 439/354, 545, 439/549, 567, 553

(56) References Cited

U.S. PATENT DOCUMENTS

| | | | |
|---|---|---|---|
| 4,352,538 | * 10/1982 | Fowler | 439/404 |
| 5,127,852 | * 7/1992 | Cravens et al. | 439/545 |
| 5,205,759 | * 4/1993 | Haderer | 439/545 |
| 5,347,882 | * 9/1994 | Klotz | 74/502.4 |
| 5,590,023 | * 12/1996 | Hernandez et al. | 361/683 |
| 5,690,512 | * 11/1997 | Zumstein et al. | 439/545 |
| 5,879,186 | * 3/1999 | Harada | 439/549 |
| 6,102,734 | * 8/2000 | Kuo | 439/545 |
| 6,129,583 | * 10/2000 | Lok | 439/545 |

FOREIGN PATENT DOCUMENTS

| | | |
|---|---|---|
| 1-126116 | 8/1986 | (JP) . |
| 5-86016 | 11/1993 | (JP) . |
| 6-32499 | 8/1994 | (JP) . |
| 7-35176 | 8/1995 | (JP) . |

* cited by examiner

Primary Examiner—Paula Bradley
Assistant Examiner—Edwin A. Léon
(74) Attorney, Agent, or Firm—Antonelli, Terry, Stout & Kraus, LLP

(57) ABSTRACT

A fixing apparatus for fixing a terminal of a control cable is composed of a fixing means which is provided in a given position of a vehicle such as automobile, construction machine, a terminal fixing metal fixture fixed to the terminal of the control cable being engaged with a bracket means without substantial play in the axial direction, and is provided for non-detachably fixing the terminal fixing metal fixture from the bracket means.

3 Claims, 6 Drawing Sheets

FIXING APPARATUS

CROSS-REFERENCE TO RELATED APPLICATION

This application is a Divisional application of U.S. application Ser. No. 08/975,201, filed Nov. 20, 1997, now U.S. Pat. No. 6,171,141, issued Jan. 9, 2001.

BACKGROUND OF THE INVENTION

The present invention relates generally to an apparatus (hereinafter referred to as a fixing apparatus) for fixing a terminal of a control cable or the like, and more particularly to an apparatus for non-detachably fixing a terminal fixing metal fixture, mounted to a control cable, onto a bracket means provided properly in a vehicle such as automobile, construction machine or the like.

There is a control appliance or the like for realizing comfortable driving, such as power window, seat moving control, rotation control of seat-back leaning, rotation control of rear view mirror, antenna taking in and out, as well as a rotation appliance for improving the vital performance to a vehicle such as optimum consumption control of an engine mounted in an automobile, a construction machine or the like, electrically-driven hydraulic control such as a pivot rise, fall control of the arm of a power steering, power shovel, and a control appliance mounted on the vehicle.

Accordingly, space for engine room is much narrowed, and therefore, various types of appliances demand much smaller size and lighter weight, and easier mounting.

To satisfy the requirements, each of special manufacturers of the control cable or the like is engaged with the development of an apparatus wherein the control cable or the like can be easily fixed on a car body.

As an apparatus wherein such a control cable or the like can be easily fixed onto a car body is disclosed a fixing apparatus (hereinafter referred to as "conventional technology 1") composed of a socket 32 mounted on the terminal of a cable 31 as shown in FIG. 5, having two flanges 34a and 34b with a groove 33 grasped between them, a bracket 35 having an approximately circular hole 35a allowing the groove 33 of the socket 32 to be detachably received in, a clip 36 having a bulge portion 36c engaged between either of two flanges 34a and 34b, and the bracket 35, as shown in, for example, Japanese Examined Utility Model Publication No. 35176/1995.

In the case of the conventional technology 1, the groove 33 of a socket 32 mounted on the terminal of the cable 31 is engaged with a hole 35a of a bracket 35. Then, the clip 36 is formed on the top portion of the clip between the flange 34b and the bracket 35. By hitting the flat portion 36b with a hammer or the like, it is inserted in a wedge shape, elastically deforming the bulge portion 36c. When the clip 36 is inserted into a given position of the bracket 35, a projection 36a is engaged with a concave portion 35b formed in the bracket 35.

In the conventional technology 1, the clip 36 is fixed so as not to be disengaged from the bracket 35 by frictional force through elastic stability force caused in the bulge portion 36c when the clip 36 is engaged with the bracket 35. Thus, the clip of the conventional technology 1 has some thickness and some rigidity. The engagement of the clip 36 has to be hit with a hammer or the like. Space for lowering the hammer is required to be provided on the periphery of the bracket.

In the case of fixing apparatus of the conventional technology 1, the socket 32 is fixed by the elastic stability force of the clip 36. When a pushing operation force is added to the control cable, the reaction force is supported by a bracket through the clip 36. The clip 36 is caused to deflect, thereby causing stroke loss. Furthermore, when a repetitive operation is conducted with high load, fatigue failure can be caused in the clip.

In Japanese Examined Utility Model Publication No. 32499/1994 is mounted is disclosed a fixing apparatus (hereinafter referred to as "conventional technology 2") composed of a socket 42 mounted on the terminal of a cable 41 as shown in FIG. 6, having two flanges 44a and 44b with a groove 43 grasped between them, a bracket 45 having an approximate hole 45a allowing the groove 43 of the socket 42 to be detachably received in, a clip 46 having a bulge portion 46c engaged between flanges 44a and the bracket 45, as shown in, for example, Japanese Examined Patent Publication No. 32499/1994.

The configuration of the conventional technology 2 is almost identical to that of the conventional technology 1. The problem points of the conventional technology 2 are similar to those of the conventional technology 1.

It is an object of this invention to provide a fixing apparatus for fixing the terminal of a control cable or the like, wherein the problem points of the conventional technologies 1 and 2 are removed, excessive space is not required for a mounting operation, the mounting is extremely easy to conduct, and the stroke loss is not caused in the control cable system.

SUMMARY OF THE INVENTION

A fixing apparatus in one embodiment of this invention is composed of a fixing means which is provided in a given position of a vehicle such as automobile, construction machine, a terminal fixing metal fixture fixed to the terminal of the control cable being engaged with a bracket means without substantial play in the axial direction whereby stroke loss is not caused in the control cable system, and is provided for non-detachably fixing the terminal fixing metal fixture from the bracket means.

A fixing apparatus of this invention fixes the terminal of the control cable through a terminal fixing metal fixture provided in the terminal of the control cable on a flat-plate bracket means provided in a given position of a vehicle such as automobile, construction machine or the like, the terminal fixing metal fixture, approximately cylindrical, composed of a main body with a groove being formed on its external peripheral surface, and a notch portion is formed in the bracket means with at least its upper portion being opened and its lower portion being semi-circular, a fixing means is desirably provided for non-detachably fixing a terminal fixing metal fixture engaged with the notch portion with the side edge of the notch portion being engaged with the groove, and the width of the groove being slightly larger than the thickness of the bracket means as the terminal fixing metal fixture is non-movable in its axial direction.

The fixing means is desirable to be a spacer interposed between either of at least a first portion and a second portion, and a bracket means, of the first and second portions defined by a groove formed in the main body portion of the terminal fixing metal fixture, to close the opened top portion of the notch portion, and form a tongue piece to be engaged with a slit formed in the bracket means.

The spacer is desirable to be engaged between the first portion and the bracket means, and between the second portion and the bracket.

The spacer is desirable to be interposed in a condition where an urged force is given between the first portion and the bracket means or between the second portion and the bracket means.

A gap between a groove formed in the main body portion of the terminal fixing metal fixture and a thickness of a bracket means to be engaged in the groove is desirable to be 0 or more, and about 0.8 mm or less.

At least one concave portion is formed between the first portion and the bracket means or between the second portion and the bracket means, and a projection to be engaged with the concave portion is desirable to be formed in a spacer.

An apparatus in another embodiment of this invention is composed of a fixing means which is engaged with a bracket means provided in a given position of a vehicle such as automobile, construction machine or the like, a terminal fixing metal fixture fixed to the terminal of the control cable from the bracket means being engaged with without substantial play in the axial direction, and is provided for non-detachably fixing the terminal fixing metal fixture.

DETAILED DESCRIPTION

An apparatus in the embodiments of this invention will be described with reference to the accompanying drawings.

Embodiment 1

Figure 1:
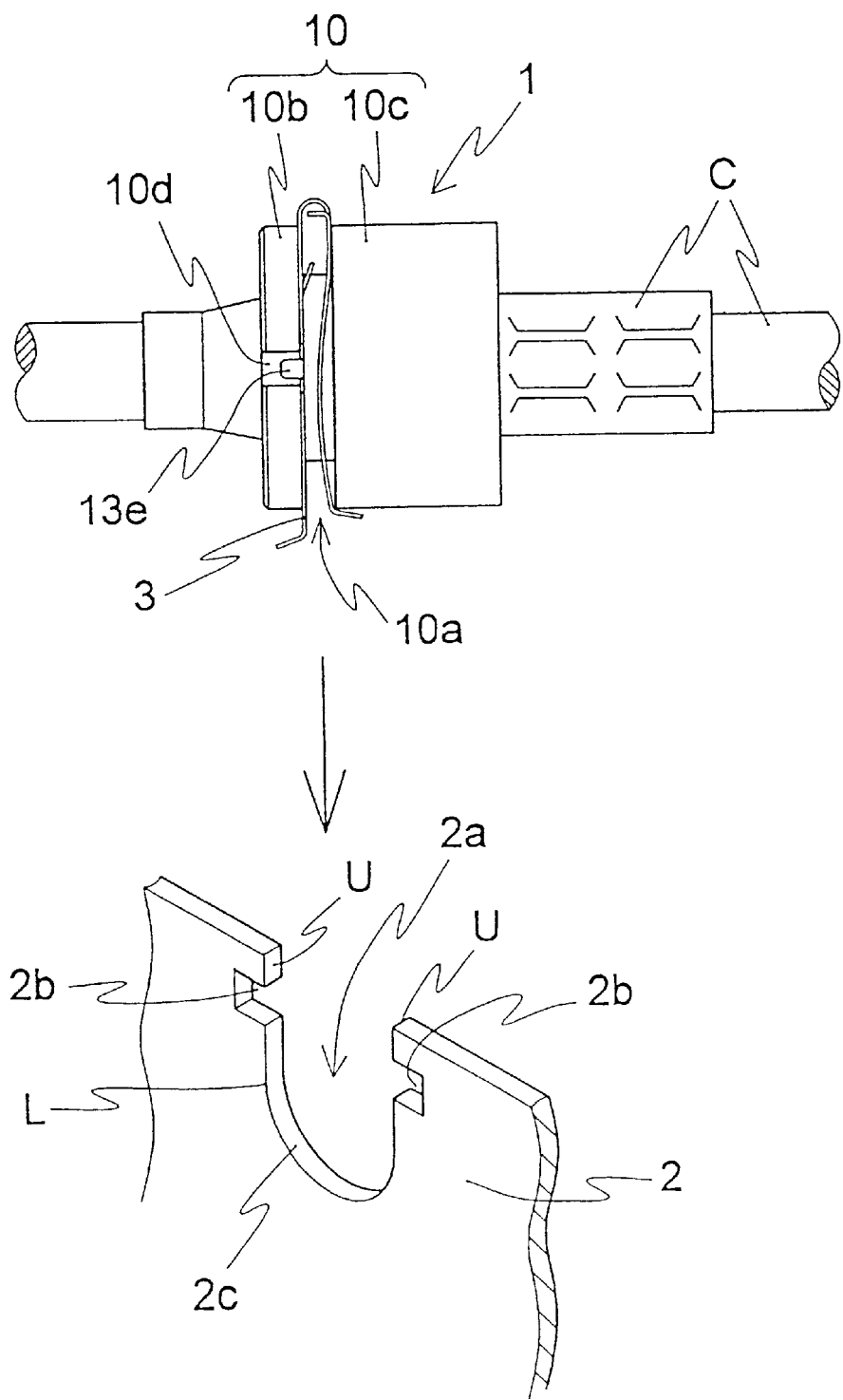
FIG. 1 is an illustrating view showing one example of a fixing apparatus in an embodiment of the present embodiment.
Figure 2A:
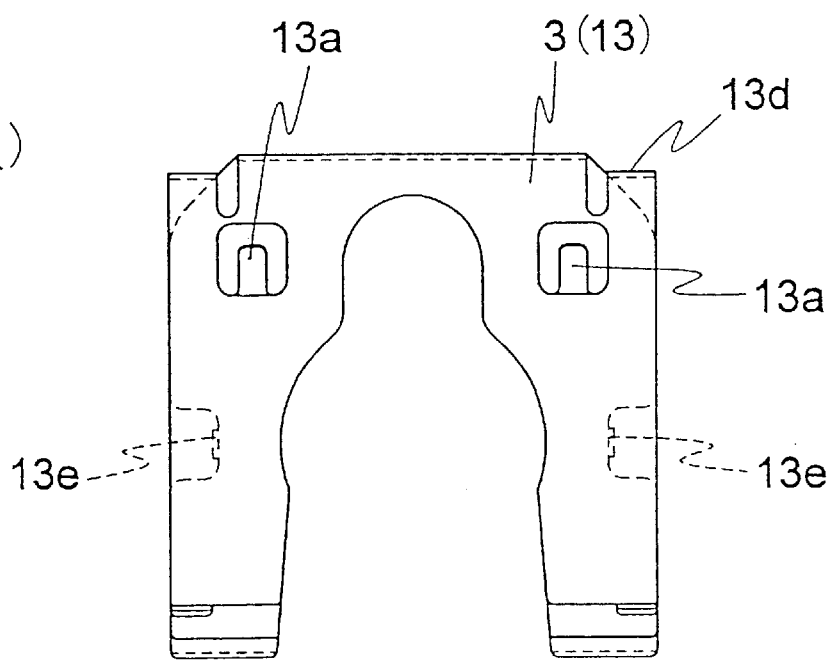
FIG. 2 is an illustrating view showing one example of a spacer to be used in an apparatus of FIG. 1.

FIG. 1 is a view for illustrating one example of a fixing apparatus in Embodiment 1 of the present invention. FIGS. 2(a) and (b) are respectively a front view and a side view of a spacer to be used in an apparatus in FIG. 1.

An apparatus of this embodiment is composed of a terminal 1 in the form of a terminal fixing metal fixture provided in a given position of a vehicle such as automobile, construction machine or the like and fixed to an end of a control cable C, a bracket means 2 for fixing the terminal fixing metal fixture 1 on a car body or the like, and a fixing means 3 for non-detachably fixing the terminal fixing metal fixture 1 from a bracket means 2 with a terminal fixing metal fixture 1 engaged with a bracket means 2 without substantial play in the axial direction (see FIG. 1). In this invention, being non-detachable means a condition where force required to pull out the terminal fixing metal fixture 1 with respect to force (approximately 60N) required to mount the fixing metal fixture 1 on a bracket means is approximately 10 times (approximately 600N) and the fixing metal fixture 1 is not disengaged from in the engagement condition.

In Embodiment 1, the terminal fixing metal fixture 1, approximately cylindrical in shape, and a groove 10a formed on external peripheral face, is composed of a main body 10 functioning as a socket with a control cable C being fixed therein.

The bracket means 2 has a notch portion 2a, with the upper portion U of the notch portion 2a being opened to receive the main body 10 in and the lower portion L being approximately semi-circular in shape.

The side edge 2c of the notch portion 2a is engaged with a groove 10a and the terminal fixing metal fixture 1 is unmovable in the axial direction, so as to make the width of the groove 10a slightly larger than the thickness of the bracket means 2.

A first portion 10b and a second portion 10c are defined by a groove 10a formed by the main body portion 10 of the terminal fixing metal fixture 1. The fixing means 3 is composed of a first including portion 13b interposed between the first portion 10b and the bracket means 2, and a second including portion 13c interposed between the second portion 10c and the bracket means 2. The first including portion 13b is continuous to the second including portion 13c to close the opened upper portion U of the notch portion 2a. As spacer piece 13 has a tongue piece 13a engaged with a slit 2b formed in the bracket means 2. As the material of the spacer 13 is adopted preferably a spring material of SUS301-CSP specified in JIS G 4313, S55C-CSP specified in JIS G 4051, SK5-CSP specified in JIS G 4401 or the like.

Reference numeral 13d is a projection for coming in contact with the upper end of the bracket means 2 for correcting so that the bracket means 2 and the spacer 13 may become a proper angle in engaging the main body 10, having a spacer 13 coupled to it, with the spacer 13 being engaged with it with the bracket means 2. Reference numerals 13f and 13g are guides bent into a shape extended so that the groove 10a may be guided smoothly to the bracket means 2 in the engagement of the main body 10 engaged with the spacer 13 with the bracket means 2. To ensure the guiding, a guide 13f or 13g is bent in a longer position.

In the embodiment, the spacer 13 has approximately "inverse U" shape in section (see FIGS. 2(a) and (b)). With restriction in such construction, the first including portion 13b or the second including portion 13c is included in the present embodiment.

If a projection 13e in either the first including portion 13b or the second including portion 13c is formed, and if a concave 10d where the projection is engaged with the main body 10 is formed, then the spacer 13 is prevented from being separated from the main body 10 until the main body 10 is engaged with the bracket means 2, or the rotation of the main body 10 can be prevented.

Figure 2B:
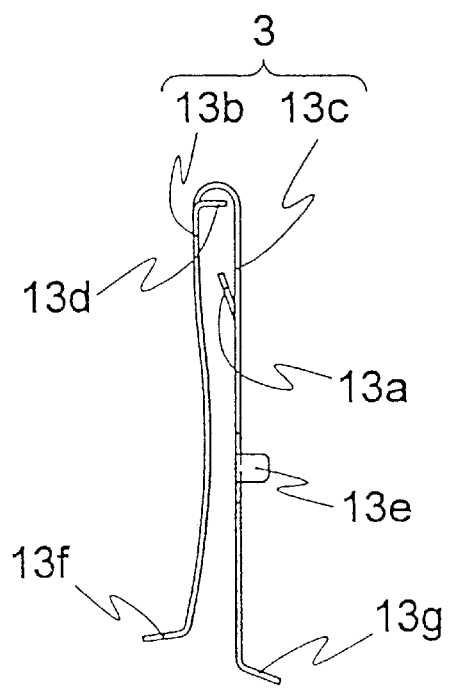

A gap between a groove 10a formed in the main body portion 10 of the terminal fixing metal fixture 1 and the thickness of the bracket means engaged with the groove 10a is 0 or more and approximately 0.8 mm or less. The thickness of the spacer 13 shown in FIG. 1 and FIG. 2 is approximately 0.4 mm.

Embodiment 2

Figure 3:
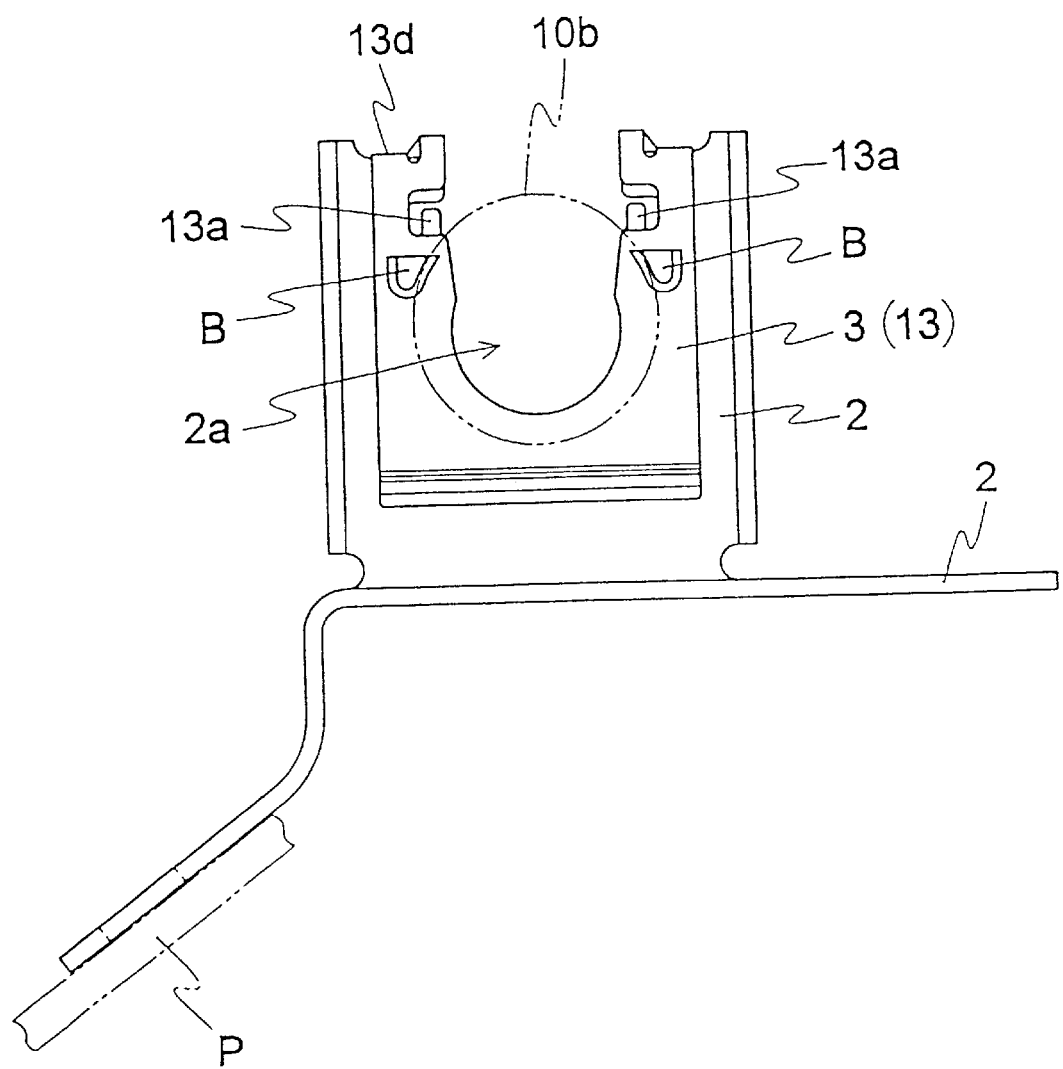
FIG. 3 is an illustrating view showing one example of a fixing apparatus in another embodiment of the invention.
Figure 4:
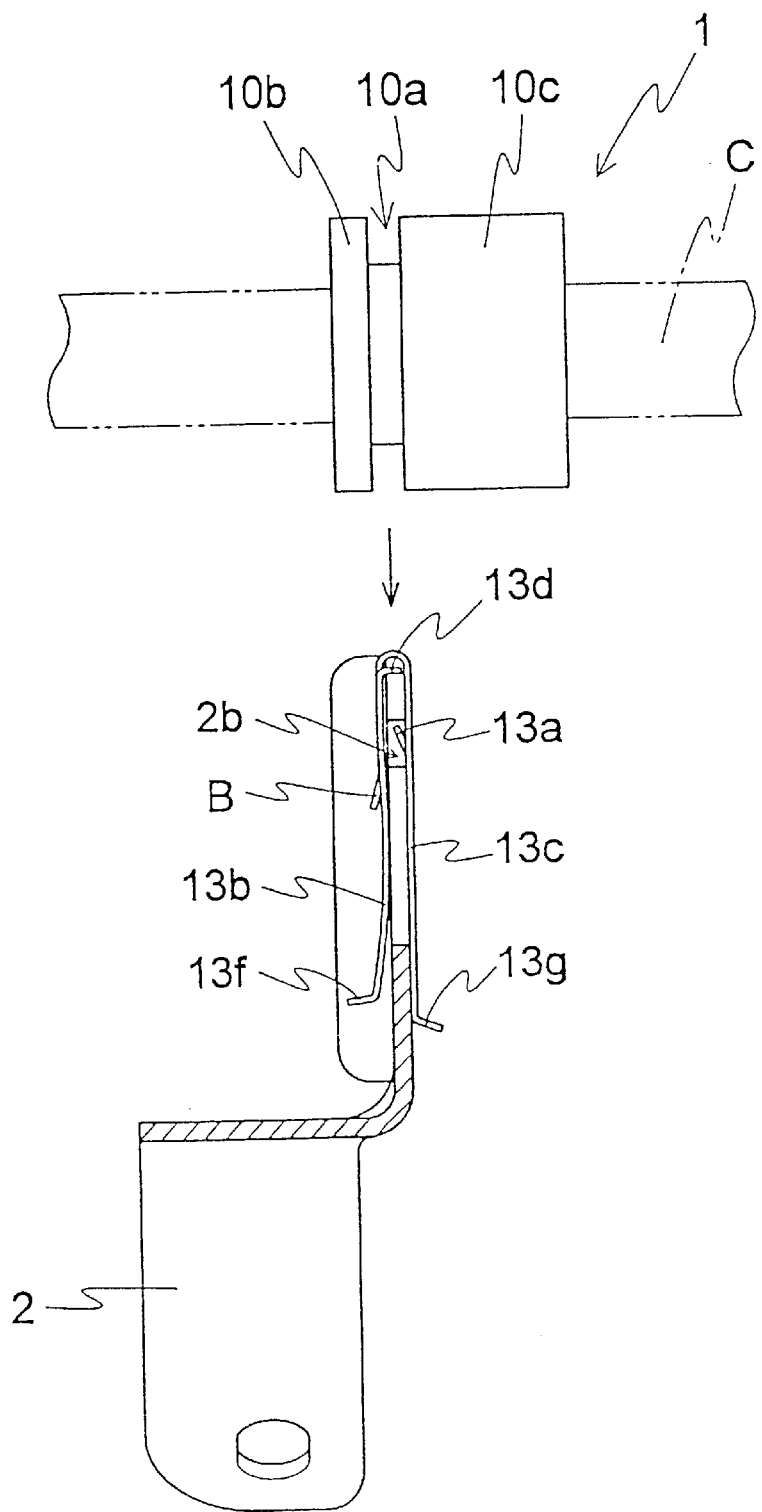
FIG. 4 is an illustrating view showing a method of mounting an apparatus of FIG. 3.
Figure 5:
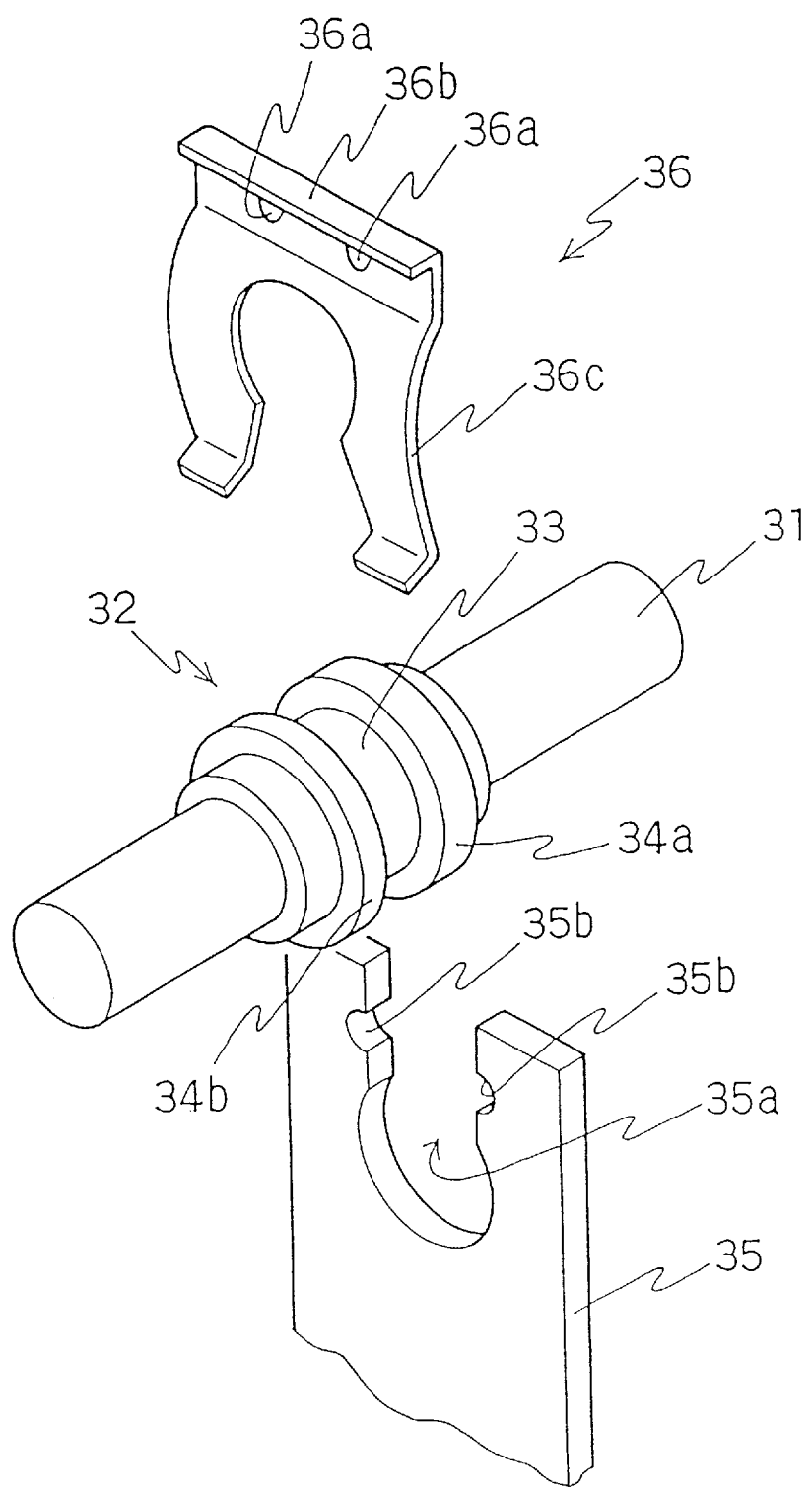
FIG. 5 is an illustrating view showing one example of the conventional apparatus.
Figure 6:
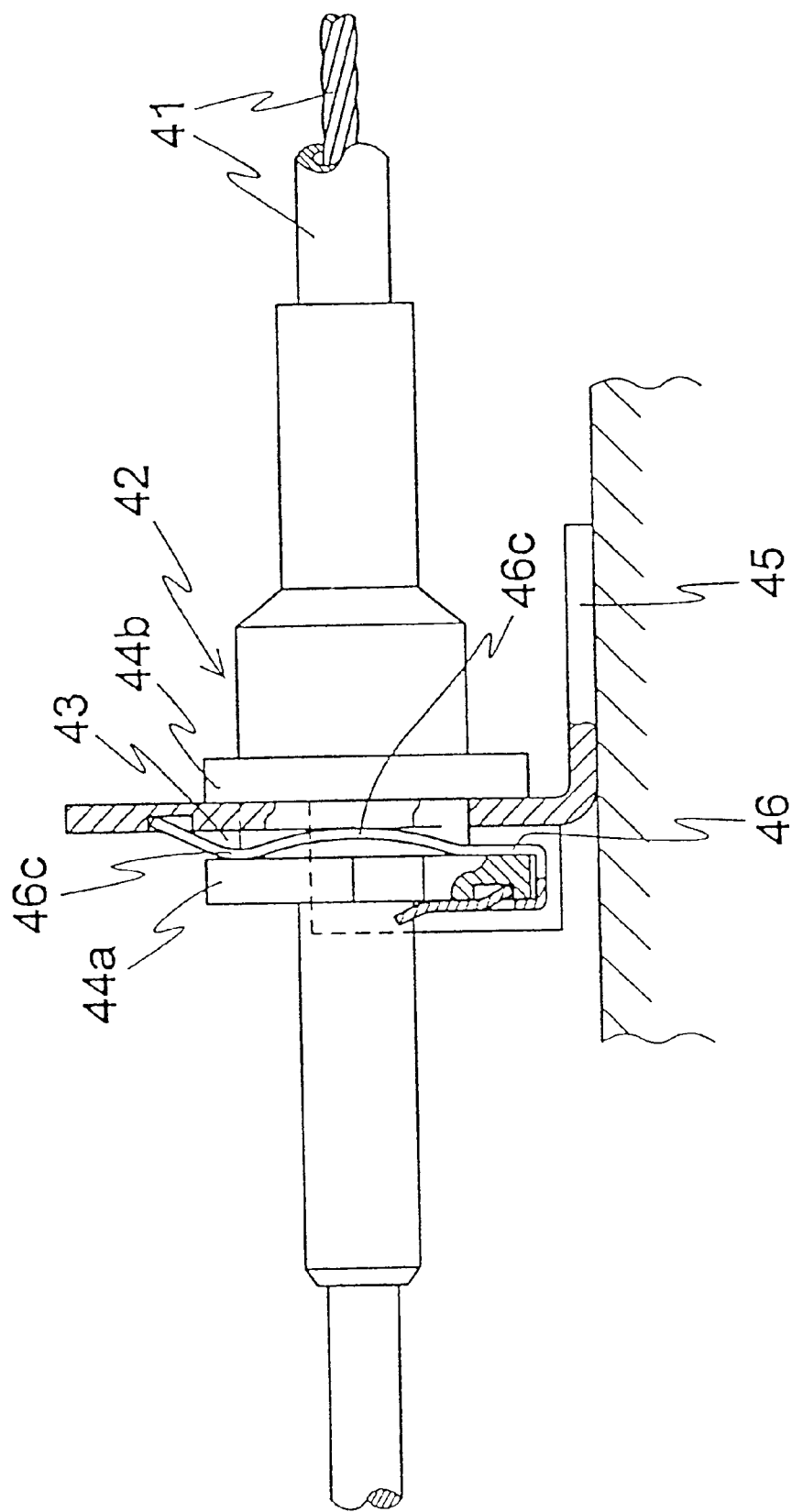
FIG. 6 is a perspective view showing another example of the conventional apparatus.

In a fixing apparatus in this embodiment, the basic construction of the embodiment 2 is the same as that of the embodiment 1. In FIGS. 3 and 4, the same positions as those of the apparatus in Embodiment 1 are given the same reference numerals. The positions in the embodiment 2 are the same as those of Embodiment 1.

Referring to FIG. 4, in the embodiment, a spacer 13 functioning as a fixing means 3 is engaged with a bracket means 2 in advance, and a tongue piece 13a is engaged with a slit 2b formed in the bracket means 1, so that the spacer 13 is not easily slipped off from the bracket means 2. In this condition, the bracket means 2 is mounted in a given position P of the engine room or the like of an automobile.

As in FIG. 4, when the peripheral edge of the notch portion 2a of the spacer 13 is engaged with a groove 10a formed in the terminal fixing metal fixture 1 and engage a tongue piece 13a into a slit 2b formed in the bracket means 2, the terminal fixing metal fixture 1 is received by the spacer 13 in such a manner that the urging means B is bent by the first portion 10b. After the spacer 13 is engaged with the peripheral edge, the terminal fixing metal fixture 1 can be retained since the urging means B returns to the original shape by the resilient force thereof and the terminal fixing metal fixture 1 is grasped without play by resilient force as a leaf spring of the spacer 13 and the urging means B. The terminal fixing metal fixture is fixed in the bracket means 2 without play in axial direction and with non-detachability.

Further, the side or portion of the urging means B touching the terminal fixing metal fixture is an arc, radius of curvature of which is the same as a radius of the first portion 10b.

In the embodiment, of the control cable C can be provided in a condition where the spacer 13 is not mounted in the terminal fixing metal fixture 1. Thus, the appliance within the engine room cannot be damaged by the edge of the spacer 13.

According to the apparatus of the invention, since the force required for engagement with the bracket of the spacer as the fixing means is approximately 60N, the engaging operation can be conducted manually. Thus, a tool such as hammer or the like is not necessary for mounting on the vehicle, it is necessary to obtain the space for mounting operation. Since the force of approximately 600N is required to pull out the spacer from the bracket means, the fixing condition can be retained positively. After the engagement, the spacer is interposed in the space between the bracket means and the main body, the space becomes approximately 0. The stroke loss is not caused in the control cable system. Furthermore, in both the first portion and the second portion, the outside diameter of each portion is larger than the width of the notch portion. The fatigue failure is not caused, because the spacer is not deflected large.

Though several embodiments of the present invention described above, it is to be understood that the present invention is not limited to the above-mentioned embodiments, and various changes and modifications may be made in the invention without departing from the spirit and scope thereof.

What is claimed is:

1. A fixing apparatus for non-detachably fixing a terminal fixing metal fixture provided on a control cable to a bracket means provided in a given position of a vehicle, wherein said terminal fixing metal fixture has a substantially cylindrical shape and comprises a main body with a groove on a peripheral surface of the main body by which a first portion and a second portion are defined, said fixing apparatus comprising a spacer having substantially inverse U shape in section, said spacer functioning as a fixing means;
wherein said spacer comprises:
a first including portion interposed between one of said first portion and said second portion and said bracket means in case where said spacer is provided on said bracket means;
a second including portion being continuous to said first including portion, said second including portion being interposed between the other one of said first portion and said second portion and said bracket means in case where said spacer is provided on said bracket means;
a tongue piece engaged with a slit formed in said bracket means in case where said spacer is provided on said bracket means; and
an urging means which is bent by said first portion as said terminal fixing metal fixture is received by said spacer, said urging means returning to an original shape based on a resilient force of the same when said spacer engages said fixture for fixedly retaining said terminal fixing metal fixture.

2. A fixing apparatus for non-detachably fixing a control cable to a bracket provided in a given position of a vehicle, said fixing apparatus comprising:
a terminal fixing metal fixture for mounting to a control cable, said fixture having a substantially cylindrical shape and comprising a main body with a groove by which a first portion and a second portion are defined, said groove being formed on a peripheral surface of the main body; and
a spacer having substantially inverse U shape in section, said spacer functioning as a fixing means;
wherein said spacer comprising:
a first including portion interposed between one of said first portion and said second portion and said bracket means in case where said spacer is provided on said bracket means;
a second including portion being continuous to said first including portion, said second including portion being interposed between the other one of said first portion and said second portion and said bracket means in case where said spacer is provided on said bracket means;
a tongue piece engaged with a slit formed in said bracket means in case where said spacer is provided on said bracket means; and
an urging means which is bent by said first portion as said terminal fixing metal fixture is received by said spacer, said urging means returning to an original shape based on a resilient force of the same when said spacer engages said fixture for fixedly retaining said terminal fixing metal fixture.

3. A fixing apparatus for non-detachably fixing a control cable to a vehicle, the fixing apparatus comprising:
a bracket for mounting in a given position of a vehicle, the bracket having a notch portion formed therein with at least the upper portion of the notch portion being open;
a terminal fixing metal fixture for mounting to a control cable, the fixture having a substantially cylindrical shape and comprising a main body with a groove by which a first portion and a second portion are defined, the groove being formed on a peripheral surface of the main body; and
a spacer having substantially inverse U shape in section, the spacer functioning as a fixing means;
wherein the spacer comprises:
a first including portion interposed between one of the first portion and the second portion and the bracket in case where the spacer is provided on the bracket;
a second including portion being continuous to the first including portion, the second including portion being interposed between the other one of the first portion and the second portion and the bracket in case where the spacer is provided on the bracket;
a tongue piece engaged with a slit formed in the bracket in case where the spacer is provided on the bracket; and an urging means which is bent by the first portion as the terminal fixing metal fixture is received by the spacer, the urging means returning to an original shape based on a resilient force of the same when the spacer engages the fixture for fixedly retaining the terminal fixing metal fixture.

* * * * *